United States Patent
Nagori et al.

(10) Patent No.: US 11,388,434 B2
(45) Date of Patent: *Jul. 12, 2022

(54) REDUCING COMPUTATIONAL COMPLEXITY WHEN VIDEO ENCODING USES BI-PREDICTIVELY ENCODED FRAMES

(71) Applicant: Texas Instruments Incorporated, Dallas, TX (US)

(72) Inventors: Soyeb Nagori, Bengaluru (IN); Arun Shankar Kudana, Bengaluru (IN); Pramod Kumar Swami, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/838,115

(22) Filed: Apr. 2, 2020

(65) Prior Publication Data

US 2020/0236394 A1    Jul. 23, 2020

Related U.S. Application Data

(63) Continuation of application No. 15/728,138, filed on Oct. 9, 2017, now Pat. No. 10,645,412, which is a (Continued)

(51) Int. Cl.
*H04N 19/523* (2014.01)
*H04N 19/105* (2014.01)
(Continued)

(52) U.S. Cl.
CPC ......... *H04N 19/523* (2014.11); *H04N 19/105* (2014.11); *H04N 19/109* (2014.11);
(Continued)

(58) Field of Classification Search
None
See application file for complete search history.

(56) References Cited

U.S. PATENT DOCUMENTS

| 7,272,184 B2 | 9/2007 | Alfonso et al. |
| 7,555,043 B2 | 6/2009 | Sato et al. |
(Continued)

FOREIGN PATENT DOCUMENTS

WO    WO-0237859 A2  *  5/2002  ........... H04N 19/176

OTHER PUBLICATIONS

"Prediction of Inter Macroblocks in P-slices" H.264 / MPEG-4 Part 10: Inter Prediction, Iain E G Richardson, Apr. 30, 2003, 3 pages.
(Continued)

*Primary Examiner* — Chikaodili E Anyikire
(74) *Attorney, Agent, or Firm* — Charles F. Koch; Charles A. Brill; Frank D. Cimino

(57) ABSTRACT

Several techniques aimed at reducing computational complexity when encoding uses bi-predictively encoded frames (B-frames) are implemented in a video encoder. In an embodiment, B-frames are not used as reference frames for encoding P-frames and other B-frames. Non-use of B-frames allows a de-blocking filter used in the video encoder to be switched off when reconstructing encoded B-frames, and use of a lower complexity filter for fractional-resolution motion search for B-frames. In another embodiment, cost functions used in motion estimation for B-frames are simplified to reduce computational complexity. In one more embodiment, fractional pixel refinement in motion search for B-frames is simplified. In yet another embodiment, predictors used in motion estimation for a macroblock in a P-frame are selected from a B-frame that uses a same reference frame as the P-frame.

13 Claims, 5 Drawing Sheets

Related U.S. Application Data continuation of application No. 12/773,145, filed on May 4, 2010, now Pat. No. 9,788,010.

(60) Provisional application No. 61/176,305, filed on May 7, 2009.

(51) Int. Cl.
*H04N 19/176* (2014.01)
*H04N 19/147* (2014.01)
*H04N 19/172* (2014.01)
*H04N 19/61* (2014.01)
*H04N 19/109* (2014.01)
*H04N 19/114* (2014.01)
*H04N 19/117* (2014.01)
*H04N 19/156* (2014.01)
*H04N 19/157* (2014.01)

(52) U.S. Cl.
CPC ......... *H04N 19/114* (2014.11); *H04N 19/117* (2014.11); *H04N 19/147* (2014.11); *H04N 19/156* (2014.11); *H04N 19/157* (2014.11); *H04N 19/172* (2014.11); *H04N 19/176* (2014.11); *H04N 19/61* (2014.11)

(56) References Cited

U.S. PATENT DOCUMENTS

| | | |
|---|---|---|
| 2002/0181591 A1 | 12/2002 | Francois et al. |
| 2004/0247190 A1 | 12/2004 | Hagai et al. |
| 2005/0063465 A1 | 3/2005 | Cote et al. |
| 2008/0137753 A1* | 6/2008 | He ......................... H04N 19/61 375/240.24 |
| 2008/0247467 A1 | 10/2008 | Rusanovskyy et al. |
| 2009/0180539 A1* | 7/2009 | Kudana ................ H04N 19/523 375/240.15 |

OTHER PUBLICATIONS

Yuri Vatis, Bernd Edler, Dieu Thanh Nguyen and Jorn Ostermann, "Two-dimensional non-separable Adaptive Wiener Interpolation Filter for H.264/AVC", ITU—Telecommunications Standardization Section Study Group 16 Question 6 Video Coding Experts Group (VCEG), Busan, Korea, Apr. 16-22, 2005, 5 pages.

"Advanced Video Coding for Generic Audiovisual Services," ITU-T Telecommunications Standardization Sector of ITU, ITU-T Rec. H.264, Nov. 2007, 564 pages.

Y. Vatis, B. Edler, I. Wassermann, D.T. Nguyen and J. Ostermann, "Coding of Coefficients of Two-Dimensional Non-Separable Adaptive Wiener Interpolation Filter", 2005, ftp:/ftp.tnt.uni-hannover.de/pub/papers/2005/VCIP-YVBEIWTNJO.pdf, 9 pages.

* cited by examiner

REDUCING COMPUTATIONAL COMPLEXITY WHEN VIDEO ENCODING USES BI-PREDICTIVELY ENCODED FRAMES

RELATED APPLICATION(S)

This application is a continuation of U.S. patent application Ser. No. 15/728,138 filed Oct. 9, 2017, which is a continuation of U.S. patent application Ser. No. 12/773,145 filed May 4, 2010, which is now U.S. Pat. No. 9,788,010, which claims the benefit of U.S. Provisional Application No. 61/176,305, filed on May 7, 2009, both of which are incorporated herein in their entirety herewith.

BACKGROUND

Technical Field

Embodiments of the present disclosure relate generally to video encoding, and more specifically to reducing computational complexity when video encoding uses bi-predictively encoded frames.

Related Art

Video encoding generally refers to operation(s) performed to encode image frames into a form suitable for transmission on a communication channel and/or storage in a storage device, and may include operations such as compression, encryption, quantization, etc.

In video encoding, an image frame is typically divided into several blocks termed macro-blocks, and each of the macro-blocks is then encoded using spatial and/or temporal compression techniques. Accordingly, compressed representation of a macro-block may be obtained based on similarity of the macro-block with other macro-blocks in the same image frame (the technique being termed intra-frame prediction), or based on similarity with macro-blocks in other (reference) frames (the technique being termed inter-frame prediction).

Inter-frame prediction of macro-blocks in an image frame may be performed using a reference frame that occurs earlier than the image frame in display (or frame generation) order, or using multiple reference frames, one reference frame occurring earlier in the display order and another occurring later in the display order.

Bi-predictively coded frames (termed B-frames) are frames whose macro-blocks may be encoded using a reference frame earlier than the B-frame in display order, using a reference frame later than the B-frame in display order, or using two reference frames one earlier and the other later in display order with respect to the B-frame. An example of a video encoding standard that used bi-predictively coded frames is H.264/AVC.

Encoding of B-frames may be associated with increased computational complexity due, at least, to the use of multiple reference frames for the encoding. Several embodiments of the present disclosure address encoding techniques aimed at reducing the computational complexity when video encoding uses bi-predictively coded frames.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

Several techniques aimed at reducing computational complexity when encoding uses bi-predictively encoded frames (B-frames) are implemented in a video encoder.

In one embodiment, B-frames are not used as reference frames for encoding P-frames and other B-frames. Non-use of B-frames allows a de-blocking filter used in the video encoder to be switched off when reconstructing encoded B-frames, and use of a lower complexity filter for fractional-resolution motion search for B-frames.

In another embodiment, cost functions used in motion estimation for B-frames are simplified to reduce computational complexity. A motion vector cost associated with motion estimation for a macro-block in a B-frame is computed based on the predicted motion vector of an immediately previous macro-block in the B-frame, obviating the need for specifically computing the predicted motion vector for the macro-block.

In another embodiment, motion estimation for a macro-block in a B-frame does not use a motion vector cost component, at least for a portion of the motion estimation process.

In one more embodiment, fractional pixel refinement during motion estimation for a macro-block in a B-frame is performed with respect to only one (but not both) of a past reference frame and a future reference frame.

In yet another embodiment, predictors used in motion estimation for a macro-block in a P-frame are selected from a B-frame that uses a same reference frame as the P-frame.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Device

Figure 1:
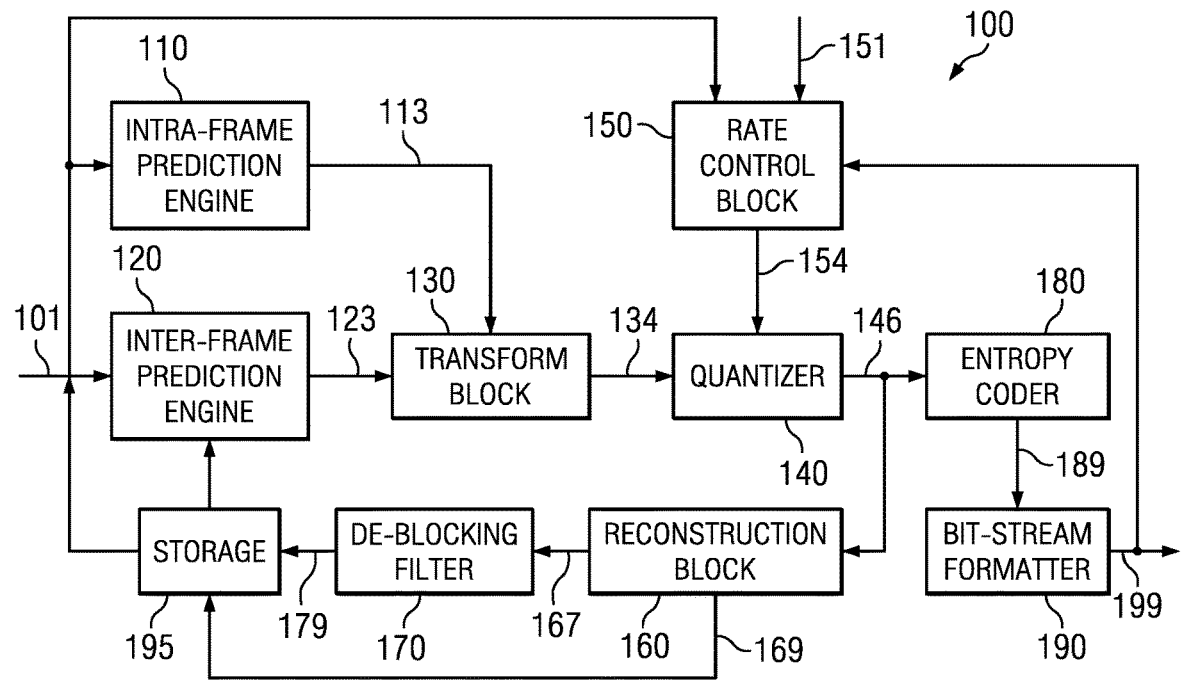
FIG. 1 is a block diagram illustrating the details of an example device in which several embodiments can be implemented.

FIG. 1 is a block diagram illustrating the details of an example device in which several embodiments can be implemented. Video encoder 100 is shown containing intra-frame prediction engine 110, inter-frame prediction engine 120, transform block 130, quantizer 140, rate control block 150, reconstruction block 160, de-blocking filter 170, entropy coder 180, bit-stream formatter 190 and storage 195. The details of video encoder 100 of FIG. 1 are meant merely to be illustrative, and real-world implementation may contain more blocks/components and/or different arrangement of the blocks/components. Video encoder 100 receives image frames (representing video) to be encoded on path 101, and generates a corresponding encoded frame (in the form of an encoded bit-stream) on path 199.

One or more of the blocks of video encoder 100 may be designed to perform video encoding consistent with one or more specifications/standards, such as H.264/AVC, in addition to being designed to address reduction of computational complexity when video encoding uses bi-predictively coded frames (B-frames), as described in detail in sections below. The relevant portions of the H.264/AVC standard noted above are available from the International Telecommunications Union as ITU-T Recommendation H.264, "ITU-T Rec. H.264 and ISO/IEC 14496-10 (MPEG4-AVC), "Advanced Video Coding for Generic Audiovisual Services," v1, May, 2003; v2, January 2004; v3, September 2004; v4, July 2005."

An image frame received on path 101 may be processed by either intra-frame prediction engine 110 or inter-frame prediction engine 120 or both, depending on whether an intra-coded frame (I-frame), inter-predicted frame (P-frame) or B-frame is to be provided to transform block 130. The specific technique (or combination of techniques) used to encode an image frame is referred to as an "encoding approach". The image frames received on path 101 may be retrieved from a storage device (for example, storage 195 or other storage device(s) connected to path 101, but not shown), and may be in (YCbCr) format. Alternatively, the image frames may be provided in (RGB) format, and converted (YCbCr) format internally in the corresponding blocks (blocks 110 and/or 120) prior to further processing.

Intra-frame prediction engine 110 receives image frames on path 101. Intra-frame prediction engine 110 operates to encode macro-blocks of a received image frame based on other macro-blocks in the same image frame. Intra-frame prediction engine 110 thus uses spatial compression techniques to encode received image frames. The specific operations to encode the frames may be performed consistent with the standard(s) noted above. Intra-frame prediction engine 110 may operate to determine correlation between macro-blocks in the image frame. A macro-block determined to have high correlation (identical or near-identical content) with another (reference) macro-block may be represented by identifiers of the reference macro-block, the location of the macro-block in the image frame with respect to the reference macro-block, and the differences (termed residual) between pixel values of the two macro-blocks. Intra-frame prediction engine 110 forwards the compressed representation of a macro-block thus formed, on path 113. For macro-blocks that are determined not to have high correlation with any other macro-block in the received image frame, intra-frame prediction engine 110 forwards the entire (uncompressed) macro-block contents (for example, original Y, Cb, Cr pixel values of pixels of the macro-block) on path 113.

Inter-frame prediction engine 120 receives image frames on path 101, and operates to encode the image frames as P-frames or B-frames. Inter-frame prediction engine 120 encodes macro-blocks of a frame to be encoded as a P-frame based on comparison with macro-blocks in a 'reference' frame that occurs earlier than the image frame in display order. Inter-frame prediction engine 120 encodes macro-blocks of a frame to be encoded as a B-frame based on comparison with macro-blocks in a 'reference' frame that occurs earlier, later or both, compared to the image frame in display order, as briefly illustrated with respect to FIGS. 2A and 2B.

For convenience of reference, a frame sought to be encoded as a B-frame is itself referred to herein as a B-frame, whether prior to encoding or after encoding. Similarly, frames sought to be encoded as P-frames and I-frames are respectively referred to herein as P-frames and I-frames, whether prior to or after encoding.

Figure 2A:
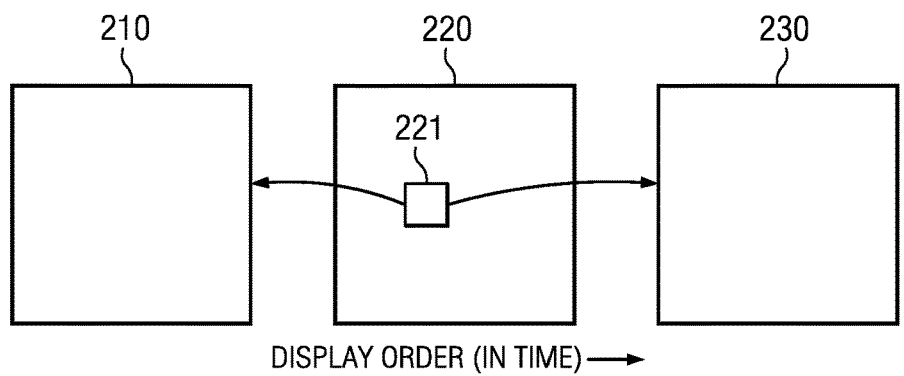
FIG. 2A is a diagram showing three image frames in display order.
Figure 2B:
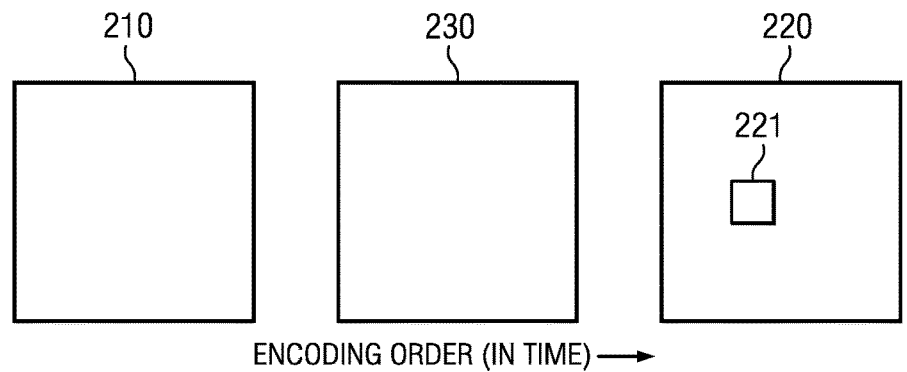
FIG. 2B is a diagram showing three image frames in encoding order.

FIG. 2A shows three image frames 210, 220 and 230 in display order sequence, i.e., frame 210 is to be displayed (on a video screen) earlier than frame 220, and frame 220 is to be displayed earlier than frame 230. It is assumed that frames 210, 220 and 230 are respectively to be encoded as I-frame, B-frame and P-frame. With respect to B-frame 220, an example macro-block 221 may be encoded based on matching macro-blocks in either frame 210, or frame 230 or both. If macro-block 221 is to be encoded based on corresponding macro-blocks (one each) in frames 210 and 230, then macro-block 221 is encoded based on a weighted sum of the residuals obtained by subtracting pixel values of pixels in macro-block 221 from each of the two matching macro-blocks (one each in frame 210 and frame 230). Since frame 230 is generated and is to be displayed later than frame 220, and B-frame 220 is allowed to use P-frame 230 as a reference frame (in addition to I-frame 210), P-frame 230 is encoded prior to encoding of B-frame 220, as shown in FIG. 2B.

Continuing with reference to FIG. 1, inter-frame prediction engine 120 therefore uses spatial compression techniques to encode B-frames as well as P-frames. The specific operations to encode P-frames and B-frames may be performed consistent with the standard(s) noted above. Inter-frame prediction engine 120 performs correlation between macro-blocks in a 'current' received image frame (on path 101), and macro-blocks in the reference frame(s) to determine macro-block pairs (or sets of macro-block pairs) that are identical or near-identical in content. For matching macro-block pairs, inter-frame prediction engine 120 computes motion vectors representing the displacement between the macro-blocks. In addition, inter-frame prediction engine 120 computes corresponding residuals (differences between pixel values of corresponding pixels of the matching macro-blocks). Inter-frame prediction engine 120 forwards the motion vectors and the corresponding residuals on path 123.

Transform block 130 transforms the residuals received on paths 113 and 123 into a compressed representation, for example, by transforming the information content in the residuals to frequency domain. In an embodiment, the transformation corresponds to a discrete cosine transformation (DCT). Accordingly, transform block 130 generates (on path 134) coefficients representing the magnitudes of the frequency components of residuals received on paths 113 and 123. Transform block 130 also forwards, on path 134, motion vectors (received on paths 113 and 123) to quantizer 140.

Quantizer 140 divides the values of coefficients corresponding to a macro-block (residual) by a quantization parameter (Qp). Alternatively, quantizer 140 may divide each coefficient in a set of coefficients representing a macro-block (or a macro-block residual) by a corresponding one of a set of quantization parameters contained in a scaling matrix. In general, the operation of quantizer 140 is designed to represent the coefficients by using a desired number of quantization steps, the number of steps used (or correspondingly the value of Qp or the values in the scaling matrix) determining the number of bits used to represent the residuals. Quantizer 140 receives the specific value of Qp (or values in the scaling matrix) to be used for quantization from rate control block 150 on path 154. Quantizer 140 forwards the quantized coefficient values and motion vectors on path 146.

Rate control block 150 receives image frames on path 101, and a 'current' transmission bit-rate from path 199, and operates to determine quantization parameter(s) to be used for quantizing transformed macro-blocks of the image frames. Rate-control block 150 may also receive data specifying a 'desired' bit-rate to be maintained (for bits transmitted on path 199) via path 151. Rate control block 150 provides the computed quantization parameter(s) on path 154.

Entropy coder 180 receives the quantized coefficients as well as motion vectors on path 146, and allocates codewords to the quantized transform coefficients. Entropy coder 180 may allocate codewords based on the frequencies of occurrence of the quantized coefficients. Frequently occurring values of the coefficients are allocated codewords that require fewer bits for their representation, and vice versa. Entropy coder 180 forwards the entropy-coded coefficients as well as motion vectors on path 189.

Bit-stream formatter 190 receives the compressed, quantized and entropy-coded output 189 (referred to as a bit-stream, for convenience) of entropy coder 180, and may include additional information such as headers, information to enable a decoder to decode the encoded frame, etc., in the bit-stream. Bit-stream formatter 190 may transmit on path 199, or store locally, the formatted bit-stream representing encoded image frames.

Reconstruction block 160 receives compressed and quantized image frames on path 146, and operates to reconstruct the image frames to generate reconstructed frames. The operations performed by reconstruction block 160 may be the reverse of the operations performed by the combination of blocks 110, 120, 130 and 140, and may be designed to be identical to those performed in a video decoder that operates to decode the encoded frames transmitted on path 199. Reconstruction block 160 forwards reconstructed B-frames on path 169 for storage in storage 195, and reconstructed I-frames and P-frames on path 167 to de-blocking filter 170. The reconstructed frames generated by reconstruction block 160 may be used as reference frames in inter-frame prediction engine 120 for encoding macro-blocks. In an embodiment, B-frames are not used as reference frames.

De-blocking filter 170 operates to remove visual artifacts that may be present in the reconstructed macro-blocks received on path 167. The artifacts may be introduced in the encoding process due, for example, to the use of different modes of encoding (I-frame, P-frame, and B-frames). Artifacts may be present, for example, at the boundaries/edges of the received macro-blocks, and de-blocking filter 170 operates to smoothen the edges of the macro-blocks to improve visual quality.

In an embodiment described below, de-blocking filter 170 is not used to filter reconstructed B-frames, and is switched-off when reconstruction block 160 outputs a reconstructed B-frame. De-blocking filter 170 forwards the filtered frames on path 179 for storage in storage 195. Storage 195 represents a memory component, and is used to store reconstructed frames.

The blocks of video encoder 100 described above may all be implemented in hardware, or all in software (by the execution of corresponding instructions by a processor), or a combination of hardware and software. Thus, assuming for example, that all the blocks are implemented in hardware, the blocks would be implemented as corresponding circuitry. Some or all of the blocks may be implemented on a same integrated circuit (IC). In such an implementation, storage 195 represents an on-chip memory element. In addition to the blocks (in IC form) video encoder 100 may contain off-chip components such as external storage (for example, in the form of non-volatile memory), input/output interfaces, etc.

Assuming that video encoder 100 is implemented substantially in software, the operations of the blocks of FIG. 1 may be performed by appropriate software instructions executed by one or more processors. In such an embodiment, storage 195 may represent a memory element contained within the processor. Again, such an embodiment, in addition to the processor, may also contain off-chip components such as external storage (for example, in the form of non-volatile memory), input/output interfaces, etc. In yet another embodiment, some of the blocks of FIG. 1 are implemented as hardware blocks, the others being implemented by execution of instructions by a processor.

Several techniques employed in video encoder 100 are designed to reduce computational complexity (and thereby also to minimize power consumption and/or resource utilization) when video encoding uses bi-predictively coded frames, as described below. In some of the example embodiments described below, B-frames are not used as reference frames for encoding P-frames or other B-frames, and the approach lends to several techniques for reducing computational complexity when B-frames are not used.

2. Reducing Computational Complexity

In an embodiment, video encoder 100 does not use B-frames as reference frames to be used in encoding of image frames (P-frames or other B-frames). Hence, in such an embodiment, video encoder 100 switches-OFF de-blocking filter 170, when the output (path 167) of reconstruction block 160 receives a reconstructed B-frame. Reconstructed B-frames are not filtered to remove blocking artifacts, and are stored directly in storage 195 via path 169. As a result, the computational complexity (in terms of time, system resources required as well as power consumption) associated with the operation of de-blocking filter 170 is not incurred when reconstructing encoded B-frames. Further, reconstructed B-frames are not written to an external storage contained in video encoder 100, thereby further reducing time, resource and power consumption.

3. Motion Search for B-Frames

In yet another embodiment, video encoder 100 uses a lower-complexity filter to perform sub-pixel interpolation when an image frame to be encoded is a B-frame. As noted above with respect to FIG. 1, encoding of a macro-block of a B-frame may be performed using intra-frame prediction techniques or inter-frame prediction techniques. When inter-frame prediction is used, a region of a reference frame (e.g., frame 210 or frame 230 of FIG. 2, if the frame to be encoded is B-frame 220) is searched to find a macro-block in the reference frame that best-matches (in terms of pixel values) the macro-block in the B-frame.

The macro-blocks in the reference frame (referred to for convenience as a reference macro-blocks) are integer-pixel aligned, i.e., a reference macro-block 'contains' or is represented by an integer number of (real) pixels. Once an 'integer-level' best-match reference macro-block is determined, the search may be further refined using interpolation techniques to determine a best-match reference macro-block with sub-pixel (e.g., half-pixel, quarter-pixel) resolution. The displacement between the macro-block to be encoded and the best-match reference macro-block is then specified as a motion vector. The extent of match between the macro-block to be encoded and the reference macro-block may be determined, for example, by computing a sum of the absolute values of the differences (SAD) between corresponding pixel values in the two macro-blocks or other suitable similarity indicators.

Figure 3:
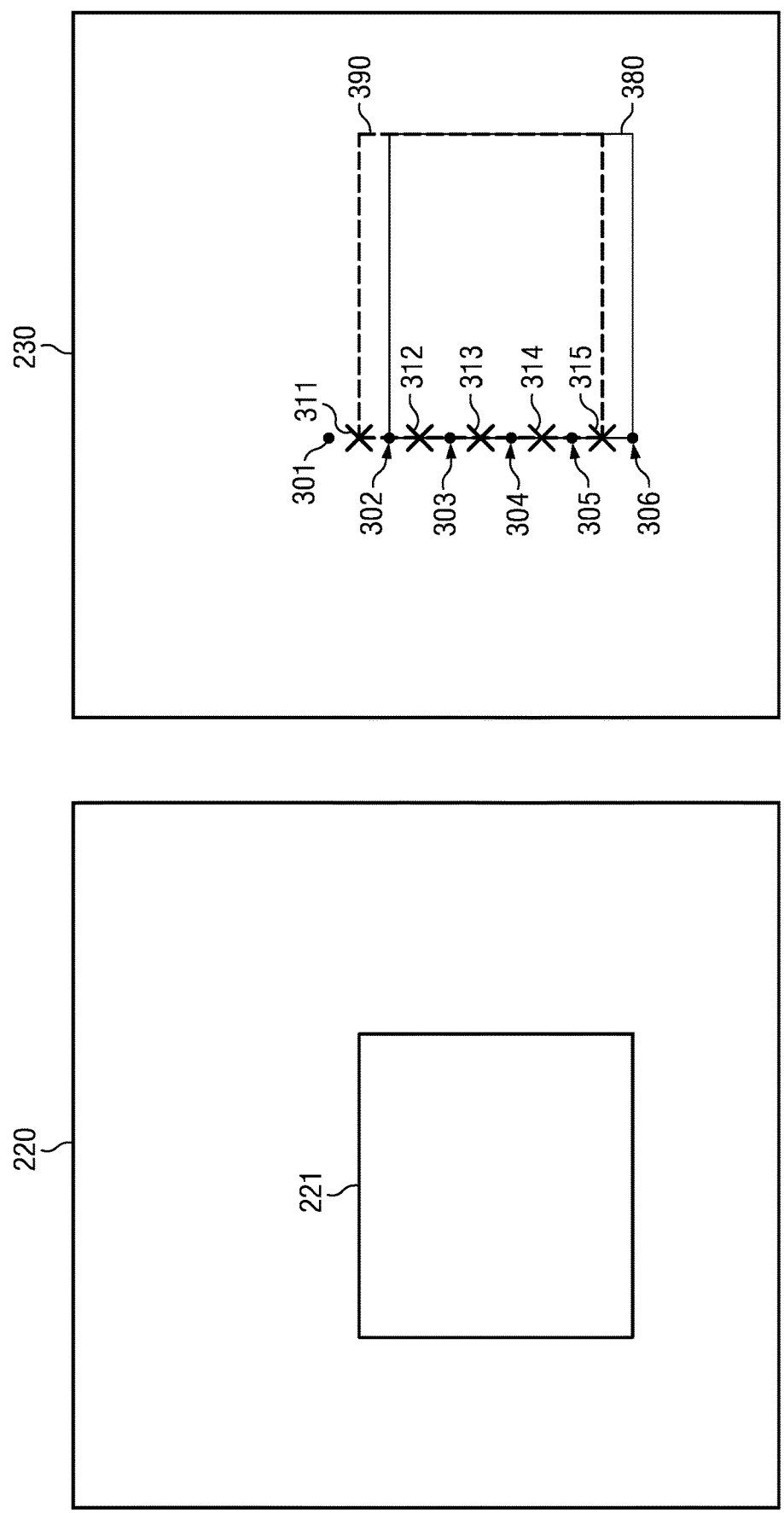
FIG. 3 is a diagram used to illustrate sub-pixel interpolation during motion search, in an embodiment.

FIG. 3 is used to briefly illustrate sub-pixel interpolation. For ease of description the macro-blocks referred to with reference to FIG. 3 are assumed to have a size of 25 (5×5) pixels. Reference macro-block 380 in P-frame 230 is assumed to be the best-match integer-resolution macro-block obtained for macro-block 221 of B-frame 220 sought to be encoded. Pixel 302 is located at the top-left vertex of reference macro-block 380. Pixels 303, 304, 305 and 306 represent the remaining four pixels in the left-most column (in the vertical direction) of pixels of macro-block 380. Pixel 301 represents a pixel immediately above (in the vertical direction) pixel 302. Location 311 represents a 'pixel-location' a half-pixel distance between pixels 301 and 302. Locations 312, 313, 314 and 315 represent other half-pixel locations along the left-most pixel column of macro-block 380. Half-pixel positions along the horizontal direction (row direction of macro-block 380 or frame 230) can also be specified, but not shown in FIG. 3 in the interest of clarity. A location mid-way between an integer pixel location and a half-pixel location is termed as being at a quarter-pixel resolution. For example, a location (not shown) midway between pixel 302 and location 311 is at a quarter-pixel distance from pixel 302.

Sub-pixel interpolation during motion estimation refers to further refining the estimate of the best-match reference macro-block 380 to obtain a reference macro-block aligned at a location that is specified in terms of sub-pixel (e.g., half-pixel, quarter-pixel, etc) resolution. Thus, reference macro-block 390 (shown in dotted lines) is specified in terms of half-pixel resolution, and is represented by the corresponding 25 'pixels' (5×5), all at half-pixel resolution locations, each of such locations midway between corresponding pixels in frame 230. For ease of description, macro-block 390 is assumed to be at a half-pixel resolution and displaced from macro-block 380 only in the vertical direction. However, the techniques for sub-pixel interpolation described herein can be extended to a matching macro-block at a half-pixel resolution displaced along both the vertical and horizontal directions from integer-resolution macro-block 380, as well. In an embodiment, for further refining to obtain a matching macro-block at quarter-pixel resolution, video encoder 100 may use a 2-tap filter as specified in the H.264 specifications.

In refining the best-match integer-pixel resolution macro-block to obtain a macro-block at sub-pixel resolutions that provides an even better match, video encoder 100 may need to determine the values of the (non-existent) pixels at the sub-pixel locations by interpolation, for example, based on the values of neighboring pixels. Thus, for example, video encoder needs to determine the 'pixel' values at locations 311, 312, 313, 314 and 315, as well as the other twenty pixels (not shown in FIG. 3, but which are additionally contained in macro-block 390) by interpolation to form macro-block 390. Video encoder 100 (or inter-frame prediction engine 120) may accordingly use filters or bilinear transforms to generate the sub-pixel values.

According to a prior approach, a 6-tap filter is used to refine the best-match integer-pixel resolution macro-block to obtain a macro-block at sub-pixel resolution. The six taps refer to the six coefficient values of a finite impulse response (FIR) filter that is to be used for the refinement. However, the use of a six-tap filter for sub-pixel motion estimation may be computationally intensive, especially for B-frames. To illustrate with respect to FIG. 3, for example, the value of location 313 of macro-block 390 is obtained by weighted summation of pixel values 301, 302, 303, 304, 305 and 306, the weights being equal to the corresponding ones of the six coefficients of the filter noted above. The values of the other twenty four 'sub-pixel' locations of macro-block 390 are similarly obtained by applying the corresponding pixel values (six for each interpolation) through the 6-tap filter.

Accordingly, in an embodiment, video encoder 100 (or inter-frame prediction engine 120 contained in it) uses a lower-complexity two-tap filter for sub-pixel interpolation during motion search for B-frames. Each interpolated sub-pixel location of a reference macro-block is obtained as specified by the following equation:

$$SP=(P+Q+1)\gg 1 \qquad \text{Equation 1a}$$

wherein,
SP is the 'pixel' value at the sub-pixel location,
P and Q respectively represent the pixel values at integer pixel locations on either side of the interpolated sub-pixel location, and
'>>' represents a right-shift-by-one-bit operation.

Thus, for example, the interpolated pixel value at half-pixel location 313 may be obtained by adding the pixel values of pixels 303 and 304, adding 1 to the sum of the pixel values, and shifting the result one bit to the right (equivalent to division by 2). Values at quarter-pixel resolution locations can be obtained by applying Equation 1a, with the change that P and Q are respectively substituted by the values at integer pixel and half-pixel locations on either side of the interpolated quarter-pixel location.

It may be appreciated that the use of a two-tap filter substantially reduces the computational complexity in obtaining each interpolated "pixel" value of a reference macro-block at sub-pixel resolution. Once all the interpolated "pixel values" are obtained, video encoder may compute whether the reference macro-block at sub-pixel resolution (macro-block 390 in the example) thus obtained sufficiently matches the macro-block to be encoded (macro-block 221 in the example of FIG. 3).

In the embodiment, B-frames are not used as reference frames for encoding other P-frames or B-frames. The reduction in accuracy that may be incurred due to the use of a two-tap filter (as against a 6-tap filter) for B-frames may not present a significant degradation in visual quality, since the degradation does not propagate to future frames to be encoded. It is noted here that the H.264/AVC standard does not mandate the use of a filter with a specific number of taps for motion-search refinement. Hence, the use of a two-tap filter for sub-pixel refinement during motion search is compatible with the standard. In the embodiment however, a six-tap filter as specified in the H.264/AVC standard for use in frame reconstruction and decoding of frames (in a decoder) is used for sub-pixel interpolation during motion search for P-frames.

In yet other embodiments, complexity reduction is obtained in the computation of cost functions associated with motion estimation operations performed for B-frames, as described next.

4. Cost Function for Motion Estimation

Motion estimation refers to operations in which video encoder 100 estimates the displacement (represented by a corresponding motion vector) of a macro-block in an image frame to be encoded, with respect to a reference frame. Typically, video encoder 100 may select a 'window' within the reference frame, and compare reference macro-blocks within the 'window' with the macro-block to be encoded. Reference macro-blocks within the window represent potential best-match macro-blocks.

For each of the potential best-match reference macro-blocks, video encoder 100 may compute a cost function. In an embodiment, the cost function is a sum of two components, a similarity indicator cost and a motion vector cost. A best-match macro-block is selected as that macro-block (among the potential best match macro-blocks in the window) that provides the least value for the cost function. The similarity indicator cost is a measure of the similarity between the (pixel values of) the macro-block to be encoded and a potential best-match reference macro-block, and is computed in an embodiment as a sum-of-absolute differences (SAD) of pixel value differences between corresponding pixels of the macro-block to be encoded and a potential best-match macro-block.

The SAD component is computed as specified by equation 1b:

$$SAD = \sum abs [c(i) - r(i)] \quad \text{Equation 1b}$$

wherein, $\Sigma$ represents a summation operation performed for the range represented by index (i), 'abs' represents an absolute-value operation, $c(i)$ represents the value of the $i^{th}$ pixel in the macro-block to be encoded, $r(i)$ represents the value of the $i^{th}$ pixel in the reference macro-block, (i) is an index with a range of values equal to the size of a macro-block in pixels.

In an embodiment, (i) has a range from 1 to 256, and the macro-blocks are 16×16 pixel macro-blocks.

The MV cost component is a cost associated with the representation (in terms of number of bits) of the motion vector representing the displacement between a reference macro-block and the macro-block to be encoded, and is computed using a predicted motion vector (PMV) for the macro-block to be encoded. The PMV is a function of the motion vectors, as well as the encoding mode(s) of macro-blocks neighboring the macro-block to be encoded. It is noted that cost functions associated with motion estimation generally need to be computed prior to actual generation of motion vectors and residuals.

Figure 4A:
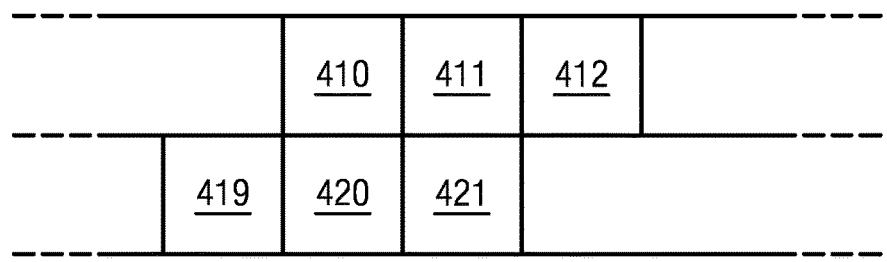
FIG. 4A is a diagram showing an example macro-block to be encoded and its neighbor macro-blocks.

FIG. 4A shows macro-blocks 410, 411, 412, 419, 420 and 421, macro-blocks 410, 411, 412 and 420 being the macro-blocks neighboring macro-block 421. Encoding of macro-blocks is performed in raster-scan order. Thus, assuming macro-block 421 is the 'current' macro-block to be encoded, computation of the PMV for macro-block 421 requires that the motion vectors, as well as the encoding mode(s) of neighbor macro-blocks 410, 411, 412 and 420, be available. However, at least in some implementation environments, such as for example, when video encoder 100 is implemented with a pipelined architecture, the availability of motion vectors and/or the encoding mode(s) of all of neighbor macro-blocks 410, 411, 412 and 420 may not be guaranteed at or prior to computation of the PMV for macro-block 421.

Figure 4B:
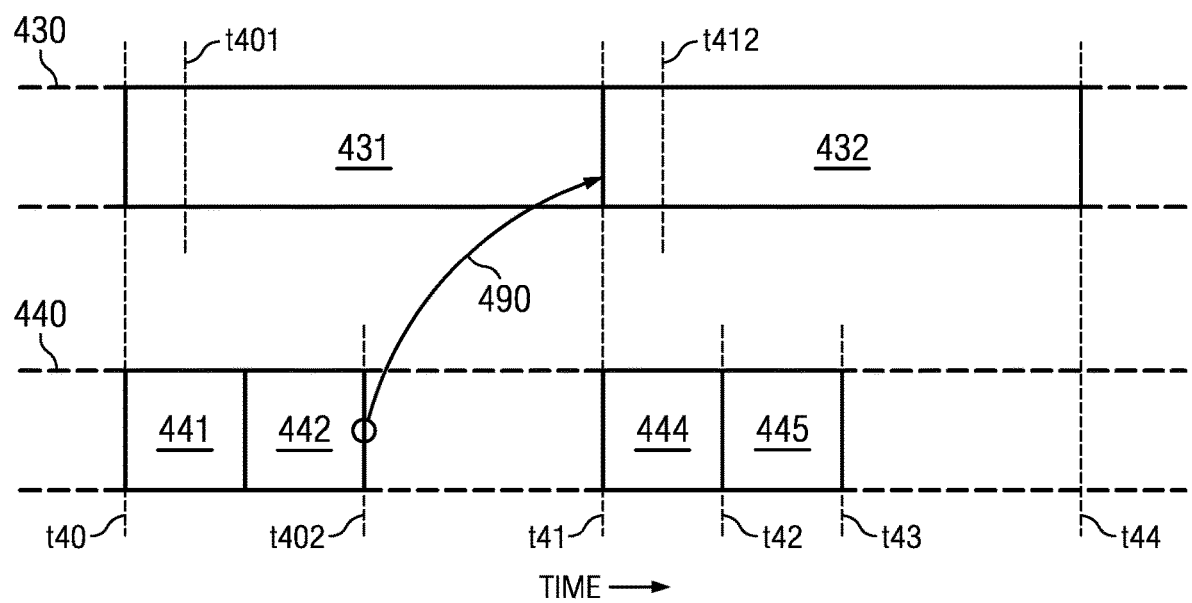
FIG. 4B is a sequence diagram illustrating the sequence of some operations involved in motion estimation used in encoding B-frames, in an embodiment.

FIG. 4B illustrates an example execution sequence of some of the tasks involved in video encoding in video encoder 100. Sequence 430 represents the operation of motion estimation, with interval 431 (t40 to t41) representing a time interval in which motion estimation for macro-block 420 is performed, and interval 432 (t41 to t44) representing a time interval in which motion estimation for macro-block 421 is performed. For convenience macro-block 421 is referred to as macro-block 'N', macro-block 420 as macro-block 'N−1', and macro-block 419 as macro-block 'N−2', since macro-block encoding occurs in raster-scan order.

Sequence 440 represents the operations of generation (or specification) of encoding mode and PMV computation for macro-blocks. Interval 441 is a time interval in which the encoding mode (i.e., whether encoded as an intra-macro-block, inter-macro-block or skip-macro-block) of macro-block 419 is generated, interval 442 is a time interval in which PMV corresponding to macro-block 420 is determined, interval 444 is a time interval in which the encoding mode of macro-block 420 is generated, and interval 445 is a time interval in which PMV corresponding to macro-block 421 is determined.

Interval t40-t401 is a time interval in which cost functions related to motion estimation for macro-block 420 are computed, and interval t41-t412 is an interval in which cost functions related to motion estimation for macro-block 421 are computed. Operations in sequences 430 and 440 may be performed by different hardware units (for example, internal to inter-frame prediction engine 120) in video encoder 100. Alternatively, operations in sequence 430 and 440 may be performed as separate execution threads (or processes) in a multi-tasked manner by a single processor.

It may be observed from FIGS. 4A and 4B that the encoding mode of macro-block 420 is not generated and available by time instance t41. Hence, the motion vector corresponding to macro-block 420 is also not available by t41. As shown in FIG. 4B, the encoding mode (and hence the motion vector) of macro-block 420, which is required by time instance t41 (commencement of cost function computation corresponding to macro-block 421) is available only at t42. Thus, due to the pipelined approach, cost function determination which is to be ideally performed in interval t41-t412 may be delayed.

In a prior approach, the drawback noted above is circumvented by using the motion vector computed for macro-block 419 (instead of MV of macro-block 420) to compute the cost function for macro-block 421. However, the prior approach may not be optimal as the use of motion vector of macro-block 419 (instead of motion vector of macro-block 420) may reduce the accuracy of the computed cost functions. Further, the approach also requires that PMV for macro-block 421 be computed twice, once during cost function computations, and the second time during computation of PMV for generating motion vector difference, which is the quantity that is actually transmitted. In the case of B-frames, the PMV computation may further be doubled since B-frame encoding may use past as well as 'future' reference frames. As a result, increased computational complexity may be associated with cost function computations for B-frames.

In an embodiment, video encoder 100 uses the PMV of macro-block 420 as the PMV for macro-block 421 (as indicated by arrow 490) for computing cost functions for encoding macro-block 421. It may be observed from FIG. 4B, that the PMV corresponding to macro-block 420 is available by t402 (end of interval 442). PMV for macro-block 421 (and for all macro-blocks in general) needs to be computed only twice, as against four times in the prior approach. Thus, complexity associated with computation of cost functions is reduced.

5. Simplified Cost Function for Evaluation of Predictors

When performing motion search, a motion vector predictor is generally selected at the start of the motion search operations for a macro-block to be encoded. Predictors refer to motion vectors of other macro-blocks that are initially evaluated as representing potential final motion vectors (or which enable finding a final accurate motion vector) for a macro-block to be encoded. For example, a motion search process may initially start with motion vectors of spatially-neighboring or temporally-neighboring macro-blocks (e.g., macro-blocks of an immediately previous frame at the same location as the macro-block to be encoded). Typically the predictors are evaluated initially to determine if they represent a potentially good estimate of a desired final and accurate motion vector.

In an embodiment (also illustrated with respect to FIGS. 4A and 4B), the cost function for evaluating predictors during motion estimation for a macro-block in a B-frame is computed as specified above in Equation 1b (i.e., only using the similarity indicator cost component, without using the motion vector cost component). Such an approach simplifies cost function computations for the predictor selection portion of motion search, and also enables a wider motion search for a macro-block of a B-frame.

In many instances, the displacement of a macro-block (such as macro-block 421) with respect to a reference frame is likely to be very similar to the displacements of neighbor macro-blocks (macro-blocks 410, 411, 412 and 420 in the case of macro-block 421) with respect to the reference frame. Hence, in the embodiment, motion estimation (specifically the selection of predictors) for macro-block 421 is initially performed with the assumption that the displacement of macro-block 421 is likely to be the same, or very similar to, the displacements of neighbor macro-block 410, 411, 412 or 420. Thus, the cost function used to compare macro-block 421 with each of the reference macro-blocks in the reference frame determined as representing the best-match displacements of macro-blocks 410, 411, 412 and 420 is based only the similarity indicator cost component (such as SAD of equation 1b), with motion vector component not being computed.

However, if the SAD components computed have values that are larger than a threshold value, motion estimation proceeds in a normal fashion, with the cost functions being computed as the sum of the corresponding SAD component and the motion vector component. Thus, the approach simplifies the cost function computation for selecting predictors for motion estimation. Further, not using the motion vector component in selecting predictors allows a search within a wider set of possible reference macro-blocks. It may be appreciated that searches with at least some of the wider set of reference macro-blocks might otherwise have been preempted at the cost function computation stage due to a possible larger motion vector cost component. Thus, in addition to reducing computational complexity, the above approach also enables a wider search to be performed, and thereby potentially enabling achievement of better compression efficiencies in general, and better compression efficiencies for high-motion video sequences in particular.

6. Fractional Pel Refinement

Figure 5:
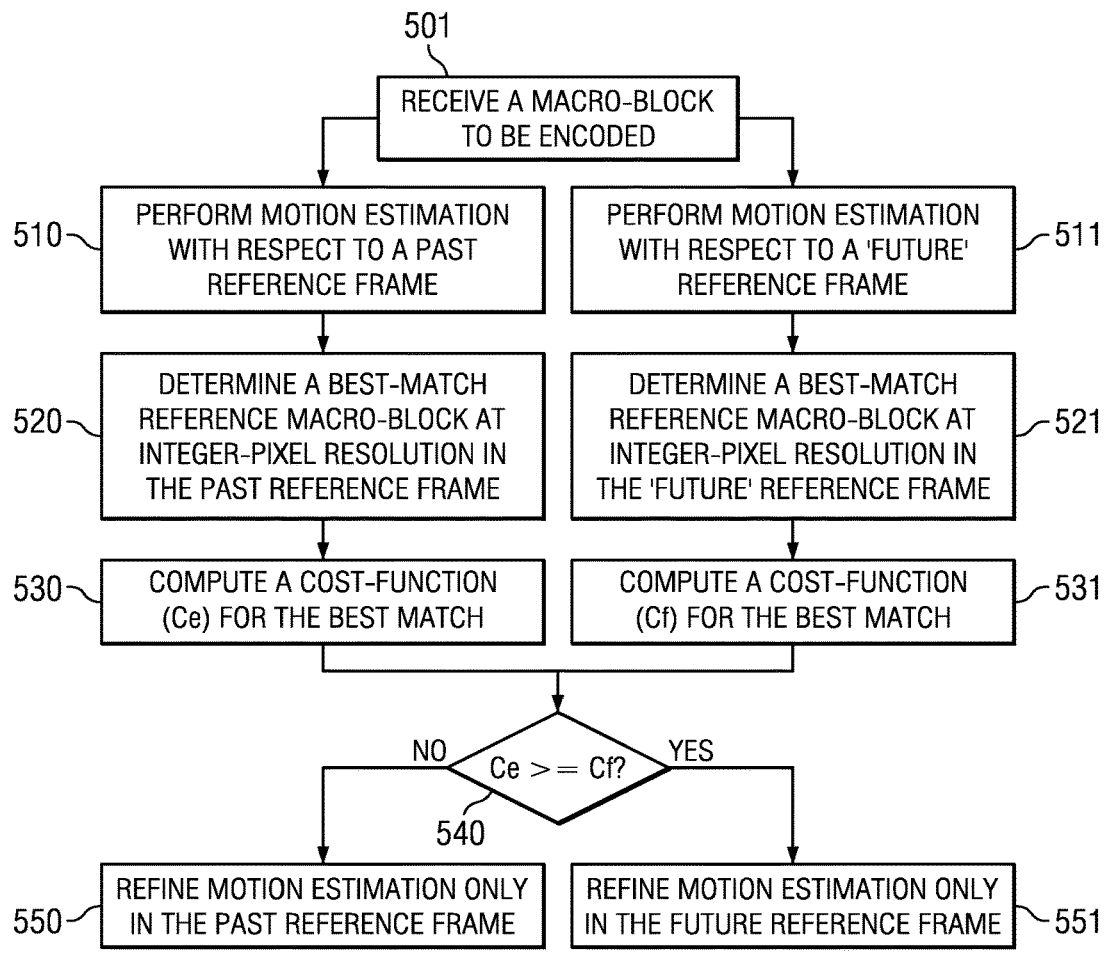
FIG. 5 is a flow diagram illustrating the manner in which fractional-pixel refinement is performed during motion estimation of B-frames, in an embodiment.

In yet another embodiment, computational complexity in performing fractional-pel (fractional-pixel)-resolution motion estimation for B-frames is reduced, as illustrated with respect to the flow diagram of FIG. 5. The steps in the flow diagram are described in a specific sequence merely for illustration. Alternative embodiments using a different sequence of steps can also be implemented without departing from the scope and spirit of several aspects of embodiments of the present disclosure, as will be apparent to one skilled in the relevant arts by reading the disclosure provided herein.

In the embodiment, motion estimation is performed for a macro-block to be encoded (shown received in step 501) with respect to each of a past reference frame (step 510) and a 'future' reference frame (step 511). The past and 'future' reference frames respectively correspond to frames earlier and later in display order than the B-frame to be encoded. The 'future' reference frame is encoded earlier than the B-frame.

A best-match reference macro-block at integer-pixel resolution is then obtained in each of the past reference frame (step 520) and the future reference frame (step 521).

Cost functions (Ce) and (Cf), respectively representing a measure of closeness (match) between the macro-block and the best-match integer-resolution macro-blocks in the past reference frame and the future reference frame, are then computed, as represented by respective steps 530 and 531. In an embodiment, cost functions Ce and Cf are computed according to equation 1b specified above.

The cost functions Ce and Cf are then compared (decision block 540). If Ce is less then Cf, then fractional pixel refinement for motion estimation is performed only in the 'future' reference frame (step 551). If Ce is greater than or equal to then Cf, then fractional pixel refinement for motion estimation is performed only in the past reference frame (step 550). Fractional pixel refinement refers to sub-pixel interpolation to determine a matching macro-block in a reference frame with sub-pixel (fractional) resolutions, and may be performed, for example, using filters as noted above.

Since fractional pel refinement is performed in only one 'direction' (with respect to either a past reference frame or a future reference frame, but not both), computational complexity is reduced. In contrast, a prior approach performs fractional pel refinement for B-frames in both directions, and is associated with corresponding additional complexity.

7. Selection of Predictors from a B-Frame

As noted above, when performing motion search, a motion vector predictor is generally selected at the start of the motion search operations for a macro-block to be encoded. For example, a motion search process may initially start with motion vectors of spatially-neighboring macro-blocks (if already encoded) as the motion vector predictors (or simply predictors, and also termed seed motion vector) for converging to the best-estimate motion vector for the macro-block. Similarly, motion vectors of temporally-neighboring macro-blocks (e.g., macro-blocks of an immediately previous frame) may also be selected as predictors.

Figure 6A:
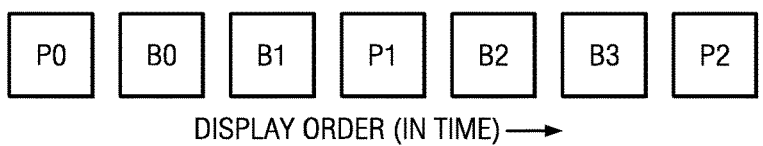
FIG. 6A is a diagram showing example image frames in display order.
Figure 6B:
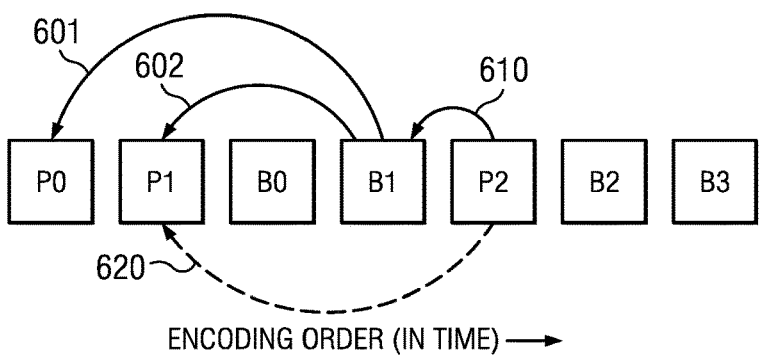
FIG. 6B is an example diagram illustrating the selection of predictors from a B-frame for motion search, in an embodiment.

FIG. 6A shows, in display order with respect to time, an example sequence of frames P0, B0, B1, P1, B2, B3 and P2, i.e., the frames P0, B0, B1, P1, B2, B3 and P2 are generated (and displayed) in that order, with P0 being generated first and P2 being generated last. Frames P0, P1, and P2 are encoded as P-frames, while frames B0, B1, B2, and B3 are encoded as B-frames. FIG. 6B shows the frames of FIG. 6A in encoding order with respect to time. Encoding order refers to the order in time in which the frames are encoded. In the example, B-frame B1 is assumed to be encoded using both P0 and P1 frames as reference frames, as indicated by arrows 601 and 602 respectively. According to a prior approach, motion vector predictors used in motion estimation for a macro-block in a P-frame are selected only from a previous P-frame. Thus, for example, in the prior approach predictors for macro-blocks in frame P2 may be selected solely from earlier P-frame P1, as indicated by dotted arrow 620.

In an embodiment, predictors for motion estimation for a macro-block of a 'current' (to be encoded) P-frame are selected from a previously-encoded B-frame that used a same P-frame as a reference frame as the 'current' P-frame. Further, only predictors in the B-frame in L1 direction are selected. L1 direction refers to references made with respect to a 'future' reference frame, occurring later than the B-frame in display or generation order. In addition, some predictors may be selected from the reference P-frame itself, as well.

To illustrate with respect to FIGS. 6A and 6B, predictors for a macro-block (or macro-blocks) in P-frame P2 are selected from among L1-direction predictors in B-frame B1, as indicated by arrow 610. For the predictors obtained from B1, the motion search operation (performed, for example, by inter-frame prediction engine 120) may determine corresponding macro-blocks in reference frame P1, and determine if there is a match or not. Additionally or optionally, predictors may be selected from P-frame P1 as well (indicated by dotted arrow 620).

Selection of predictors from a previously encoded B-frame (B1 in the example) may provide several benefits. For example, B1 having already been encoded with P1 as a reference frame, selection of predictors from B1 may be more likely to provide quick convergence of the motion search operations. Additionally, frame B1 being very close (in terms of display order) to reference frame P1, the probability of getting a good match for the macro-block to be encoded in frame P2 is higher if predictors are selected from B1. Further, predictors from B1 may be more reliable when the video stream shown in FIG. 6A is a high-motion video stream, i.e., there is fast movement of scene contents from frame to frame in the video stream. For example, selection of predictors (for encoding macro-blocks of a P-frame) from B-frames for high-motion video sequences may improve peak signal-to-noise ratio (PSNR) by up to 0.8 deciBels (dB), or equivalently enables 16% reduction in transmission bit-rate, and may thus provide greater compression efficiency.

Video encoder 100 may be implemented with the techniques described above operative independently or as a combination of two or more techniques. As noted above, video encoder 100 may be implemented using software, hardware, or a combination of hardware and software. In general, when throughput performance is of primary consideration, the implementation is done more in hardware (e.g., in the form of an application specific integrated circuit). When cost is of primary consideration, the implementation is performed more in software (e.g., using a processor executing instructions provided in software/firmware). Cost and performance can be balanced by employing a mix of hardware, software and/or firmware. All of the implementation approaches noted above may be designed to incorporate at least some degree of parallelism or pipelining. For example, when the implementation is substantially in software, some of the time-critical and/or compute-intensive operations may be executed by dedicated hardware units, with the less time-critical and/or less compute-intensive operations being executed by software instructions. An example embodiment implemented substantially in software is described next.

8. Digital Processing System

Figure 7:
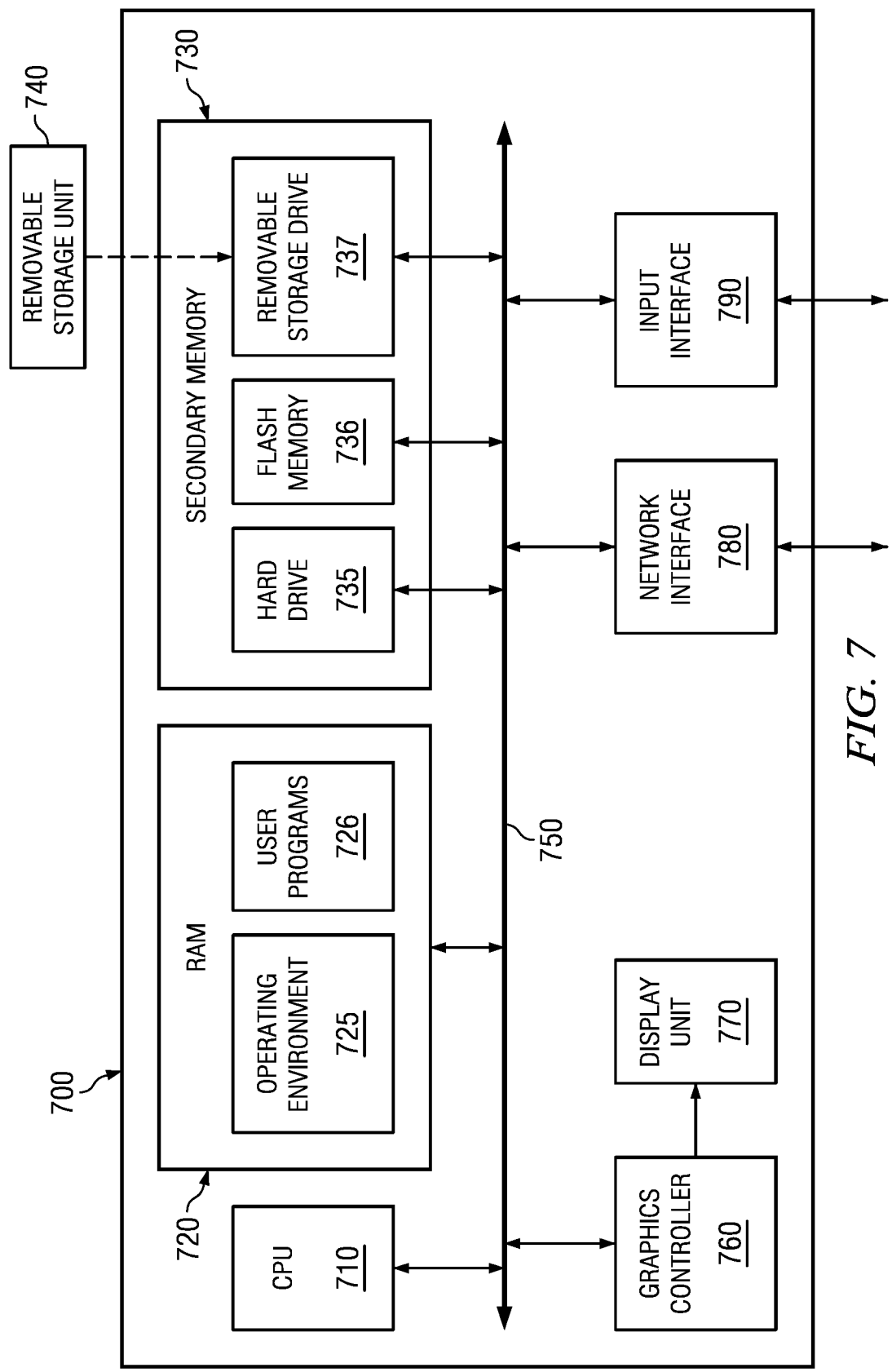
FIG. 7 is a block diagram illustrating the details of a digital processing system in which several embodiments can be implemented based on operation of software instructions.

FIG. 7 is a block diagram illustrating the details of a digital processing system (700) in which several embodiments of video encoder 100 of FIG. 1 can be implemented and operative by execution of appropriate execution modules containing processor instructions. Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses, as is well known in the relevant arts. The components of FIG. 7 are described below in further detail.

CPU 710 may execute instructions stored in RAM 720 to implement several of the embodiments described above. The instructions may include those executed by the various blocks of FIG. 1. CPU 710 may contain multiple processing units, with each processing unit potentially being designed for a specific task. Alternatively, CPU 710 may contain only a single general-purpose processing unit.

RAM 720 may receive instructions from secondary memory 730 via communication path 750. RAM 720 is shown currently containing software instructions constituting operating environment 725 and user programs 726 (such as are executed by the blocks of FIG. 1). The operating environment contains utilities shared by user programs, and such shared utilities include operating system, device drivers, etc., which provide a (common) run time environment for execution of user programs/applications.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse), and may be used to provide inputs. Network interface 780 provides connectivity (by appropriate physical, electrical, and other protocol interfaces) to a network (not shown, but which may be electrically connected to path 199 of FIG. 1), and may be used to communicate with other systems connected to the network.

Secondary memory 730 contains hard drive 735, flash memory 736, and removable storage drive 737. Secondary memory 730 may store data and software instructions, which enable digital processing system 700 to provide several features in accordance with the description provided above. The blocks/components of secondary memory 730 constitute computer (or machine) readable media, and are means for providing software to digital processing system 700. CPU 710 may retrieve the software instructions, and execute the instructions to provide several features of the embodiments described above Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

The invention claimed is:

1. A method comprising:
receiving, by at least one processor, a first macro-block of an image frame;
computing, by the at least one processor, a cost function of the first macro-block, comprising:
determining a potential best-match macro-block in a region of a reference frame by comparing a pixel value of the potential best-match macro block to a pixel value of the first macro-block; and
computing the cost function of the first macro-block based on a sum-of-absolute differences (SAD) values of pixel value differences between pixels of the first macro-block and the potential best-match macro-block and a predicted motion vector (PMV) of the first macro-block, in response to determining that the first macro-block is a B-frame;
performing fractional pixel refinement for motion estimation on the reference frame based on the computed cost function of the first macro-block;
computing, by the at least one processor, a motion vector for the first macro-block based on the cost function of the first macro-block, wherein computing the motion vector includes performing sub-pixel interpolation; and
encoding, by the at least one processor, the image frame based on the motion vector for the first macro-block.

2. The method of claim 1, wherein computing the cost function of the first macro-block further is in response to determining that the SAD values are greater than a threshold.

3. The method of claim 1, further comprising disabling a de-blocking filter for the first macro-block, in response to determining that the first macro-block is a B-frame.

4. The method of claim 1, wherein performing the sub-pixel interpolation comprises using a two-tap filter, in response to determining that the first macro-block is a B-frame.

5. The method of claim 1, wherein the first macro-block is a B-frame, and wherein the first macro-block is not used as a reference frame for a second macro-block.

6. The method of claim 1, wherein computing the cost function is performed based on a PMV of a second macro-block.

7. The method of claim 1, wherein the first macro-block is a B-frame, and wherein computing the cost function comprises:
computing a first cost function between the first macro-block and a past reference frame;
computing a second cost function between the first macro-block and a future reference frame;
performing fractional pixel refinement for motion estimation on the future reference frame in response to determining that the first cost function is less than the second cost function; and
performing fractional pixel refinement for motion estimation on the past reference frame in response to determining that the first cost function is greater than or equal to the second cost function.

8. The method of claim 1, wherein computing the motion vector is performed based on a previously encoded B-frame.

9. A digital processing system comprising:
at least one processor; and
a non-transitory computer readable storage medium storing a program for execution by the at least one processor, the program including instructions to:
receive a first macro-block of an image frame;
compute a cost function of the first macro-block, comprising instructions to:
determine a potential best-match macro-block in a region of a reference frame by comparing a pixel value of the potential best-match macro block to a pixel value of the first macro-block; and
compute the cost function of the first macro-block based on a sum-of-absolute differences (SAD) values of pixel value differences between pixels of the first macro-block and the potential best-match macro-block and a predicted motion vector (PMV) of the first macro-block, in response to determining that the first macro-block is a B-frame;
perform fractional pixel refinement for motion estimation on the reference frame based on the computed cost function of the first macro-block;
compute a motion vector for the first macro-block based on the cost function of the first macro-block, wherein the instructions to compute the motion vector include instructions to perform sub-pixel interpolation; and
encode the image frame based on the motion vector for the first macro-block.

10. The digital processing system of claim 9, wherein the instructions to compute the cost function of the first macro-block is in response to determining that the SAD values are greater than a threshold.

11. The digital processing system of claim 9, wherein the instructions further comprise instructions to disable a de-blocking filter for the first macro-block, in response to determining that the first macro-block is a B-frame.

12. The digital processing system of claim 9, wherein the first macro-block is a B-frame, and wherein the instructions to compute the cost function comprise instructions to:
compute a first cost function between the first macro-block and a past reference frame;
compute a second cost function between the first macro-block and a future reference frame;
perform fractional pixel refinement for motion estimation on the future reference frame in response to determining that the first cost function is less than the second cost function; and
perform fractional pixel refinement for motion estimation on the past reference frame in response to determining that the first cost function is greater than or equal to the second cost function.

13. The digital processing system of claim 9, wherein computing the motion vector is performed based on a previously encoded B-frame.

* * * * *